Jan. 29, 1963     C. J. BAKER     3,075,355
HYDRAULIC MOTOR

Filed Aug. 25, 1958     2 Sheets-Sheet 1

INVENTOR.
CHARLES J. BAKER
BY
BUCKHORN, CHEATHAM & BLORE
ATTORNEYS

Jan. 29, 1963     C. J. BAKER     3,075,355
HYDRAULIC MOTOR
Filed Aug. 25, 1958     2 Sheets-Sheet 2
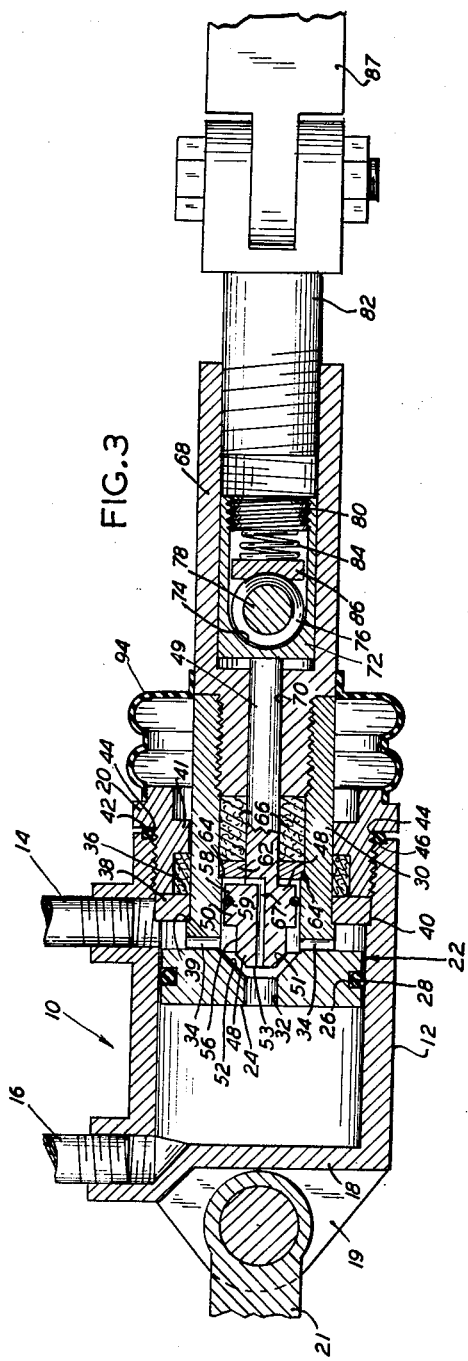
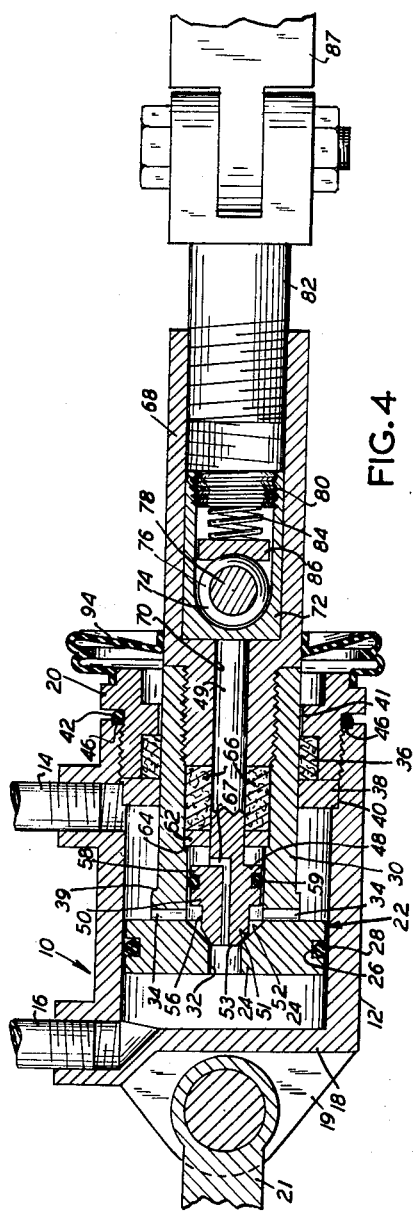
*INVENTOR.*
CHARLES J. BAKER
*BY*
BUCKHORN, CHEATHAM & BLORE
*ATTORNEYS*

United States Patent Office 3,075,355
Patented Jan. 29, 1963

3,075,355
HYDRAULIC MOTOR
Charles J. Baker, Rte. 1, Box 447A, Dallas, Oreg.
Filed Aug. 25, 1958, Ser. No. 756,903
5 Claims. (Cl. 60—97)

The present invention relates to a servo system and more particularly to a new and improved motor for use in such system.

It is an object of the present invention to provide a new and improved fluid motor so constructed that the fluid circuit therethrough is subtantially open at all times thereby enabling use of a number of such motors in series with a single source of pressure fluid.

Another object of the invention is to provide a servo motor including a piston having a valve member associated therewith adapted mechanically to engage the piston to transmit a force thereto and mechanically to move the piston in the event of failure in the fluid system.

A further object of the invention is to provide a fluid motor having a minimum number of fluid seals.

Still another object of the invention is to provide a fluid motor constructed and arranged automatically to return to neutral position when operation of the motor is terminated.

Still another object of the invention is to provide a servo system including a plurality of fluid motors connected in series to a single source of pressure fluid.

A particular object of the invention is to provide a servo or booster system for use in controlling the operation of steering clutches of crawler type tractors and which system can be easily installed upon such tractors.

A further object is to provide a servo system for controlling an element of a mechanical device such as a steering clutch of a crawler tractor that enables an operator to "feel" the action of such element so as to maintain sensitive control over the same.

Other objects and advantages of the invention will become more apparent hereinafter.

In accordance with the illustrated embodiment, the present invention comprises a fluid motor including a cylinder having a fluid inlet at one end and a fluid outlet at the other end. Arranged in the cylinder is a piston provided with a passage therethrough for the transmission of fluid from the inlet through the outlet of the cylinder in the inactive condition of the motor, the piston being provided with a piston rod which extends out of the fluid inlet end of the cylinder. A valve member is provided in the piston for controlling the flow of fluid through the piston passage whereby upon closure of such valve, pressure will increase on the inlet side of the piston to activate the same. A control element is provided for the valve, which element extends outwardly of the motor through the piston rod. In the servo system of the invention, such a motor is connected in series to other motors with a restriction in the outlet stream of the downstream motor whereby back pressure is created on the outlet side of the piston and valve in the active condition of the motors to urge the pistons towards the inlet side of the motors and to urge the valves to open condition thus to provide a continuous fluid circuit so that any one of the motors in series can be operated at any time independently of the other motors and without affecting such other motors.

For a more detailed description of the invention, reference is made to the following specification and to the accompanying drawings wherein:

FIG. 3 is a longitudinal section of the motor showing it in its "inactive" condition; and FIG. 4 is a further longitudinal section of the motor showing it in its activated condition.

Figure 1:
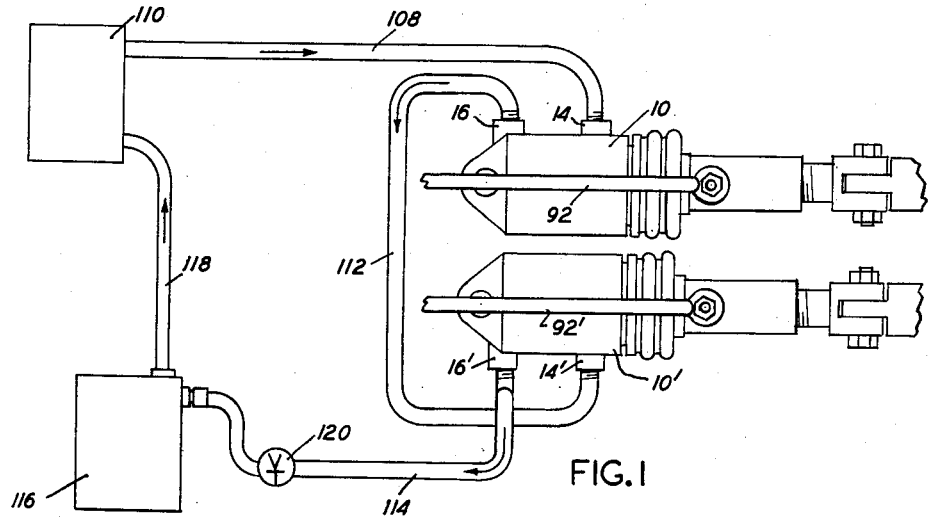
FIG. 1 is a schematic view of the servo system of the invention.

With particular reference now to FIGS. 3 and 4, the motor of the invention indicated generally at 10 comprises a cylinder 12 provided with an inlet port 14 and an outlet port 16. The cylinder 12 may be formed as an integral body such as by casting with an integral solid end 18 adjacent the outlet port 16 having a clevis 19 formed thereon for securing the cylinder to an anchoring member 21. The opposite or inlet end of the cylinder 12 may be sealed by means of a head 20, more particularly described hereinafter, and which in the illustrated embodiment is threadedly engaged in the end of the cylinder. Mounted within the cylinder 12 for axially slidable movement therein is a piston 22 including a head portion 24 which may be provided with an annular groove 26 for receiving and retaining a ring seal 28. Secured to the piston head portion 24 and extending outwardly of the cylinder through the cylinder head 20 is a tubular member 30 providing piston rod means for the piston 22. The piston head portion 24 and the tubular member 30 may be formed as an integral body. The piston head portion 24 is provided with a centrally disposed opening 32 therethrough of smaller diameter than the inner diameter of the piston rod 30 and a plurality of apertures or ports 34 are formed in the piston rod 30 immediately adjacent the piston head portion 24 to permit passage of fluid from the inlet 14 through such ports into the interior of the piston rod 30 and thence through the opening 32 into the cylinder and outwardly of the motor through the outlet 16.

To prevent leakage of fluid outwardly of the cylinder along the outer wall of the piston rod 30, suitable dynamic sealing means such as chevron packing 36 is provided and which is retained in position between a gland 38 engaging within a groove 40 formed in the cylinder wall and a collar 41 formed on the head 20. In the inactive position of the motor, the gland 38 engages a shoulder 39 formed on the piston rod 30 to hold the piston head 24 in spaced relation from the cylinder head 20. To stop leakage through the threads between the cylinder 12 and head 20, a static seal such as an O-ring 42 may be provided seated in a peripheral groove 44 formed in the head 20 and engaging within a notch 46 in the end of the cylinder 12.

Mounted within the piston 22 is a valve member 48 including a control element or stem 49 and a head 50 having a conically tapered seat 51 formed on the forward end thereof for engaging a cooperatively tapered seat 52 formed in the piston head portion 24 about the opening 32. As most clearly shown in FIG. 4, the angle of taper of the seat 51 relative to the axis of the motor is slightly less than the angle of taper of the seat 52 so that seats 51 and 52 actually engage only along a line of contact immediately adjacent the opening 32. The advantages of this structure will be described subsequently. The center portion 53 of the end face of the valve head 50 is flat and is of a diameter just slightly less than the opening 32. Preferably, the face 53 and the stem 49 are of substantially equal diameters. The intermediate portion 56 of the valve head 50 is relieved so as to provide an annular passage about the valve member for fluid flowing inwardly through the ports 34. The rearward portion of the valve head 50 is defined by an annular portion or collar 58 which slidably engages the inner wall of the piston rod 30 to guide the valve head and retain it in centered position. Mounted in the periphery of the collar 58 is a ring seal 59.

The valve actuating stem 49 extends outwardly of the motor through the piston rod 30. A suitable dynamic seal is provided to prevent leakage of fluid along the stem 49 including a gland 62, which abuts against a shoulder 64 formed in the wall of the piston rod 30, and chevron packing 66 compressed between the gland 62 and the end of an extension unit 68 threadedly engaged in the end of the piston rod 30. It will be observed that the only dynamic fluid seals required in the motor 10 are the seal presently described and the seal formed by the packing 36.

To provide a vent for the space between the rearmost face of the valve head 50 and the gland 62 a vent passage 67 is provided, the full purpose of which will be more fully explained hereinafter. As shown in FIGS. 3 and 4, the vent passage 67 extends from the face 53 coaxially of the head 50 to the stem 49 and then extends through the stem to the surface thereof at a point immediately adjacent the head 50.

The extension unit 68 is provided with a bore 70 through which the valve stem 49 extends into an enlarged hollow interior of the extension unit 68 in which is slidably mounted an actuating block 72 against which the end of the stem 49 abuts. The actuating block defines at its forward end a socket 74 for receiving the ball end 76 of an actuating lever 78. Threaded into the opposite end of the actuating block 72 is a stop element 80. The ball end 76 is urged against the socket end 74 of the actuating block by means of a spring 84 positioned between the stop element 80 and a pressure disc 86 engaging the ball 76. A clevis 82 or other means for connecting the motor 10 to an element 87 of the system to be moved may be threadedly engaged in the end of the extension unit 68.

Figure 2:
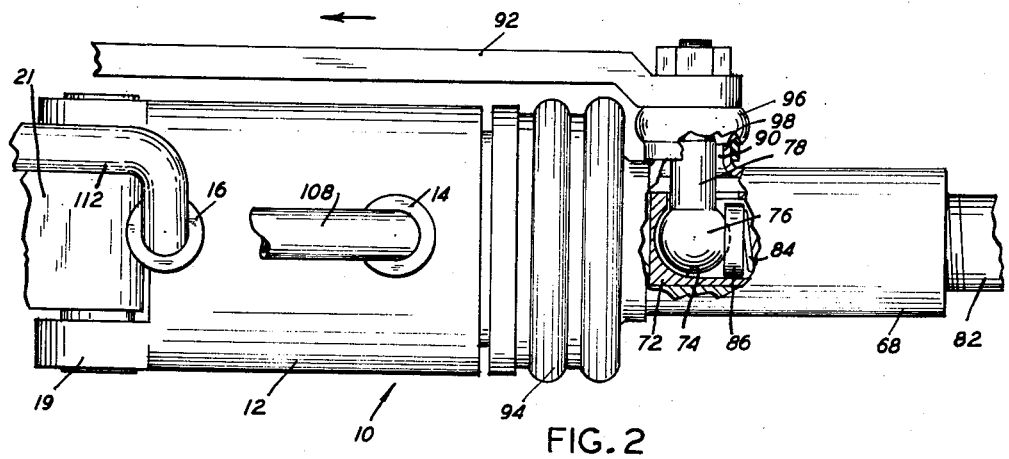
FIG. 2 is an enlarged side elevation of a motor made in accordance with the invention, the motor being partly broken away to show details thereof.

As shown in FIG. 2, the actuating lever 78 extends outwardly of the extension unit 68 through an opening 90, the outer end of the actuating lever being adapted to be secured to an operating lever 92 suitably connected to suitable operating mechanism (not shown) to effect substantially rectilinear movement of the operating lever 92 in a direction parallel to the axis of the cylinder or in the direction of the arrow shown in FIG. 2.

To help protect the motor against entry of dust, dirt and other foreign matter, a boot-type cover 94 may be secured between the cylinder head 20 and the extension unit 68 and a similar cover 96 may be arranged about the actuating lever 78 and a neck 98 projecting from the extension unit 68.

The operation of the motor is as follows: In the inactive condition of the motor, fluid simply enters the motor through the inlet 14 and flows through the ports 34 into the interior of the piston 22. If the valve member 48 is not already in its inactive position, it will be caused to move toward the right and to the inactive position shown in FIG. 3 by reason of the greater force on the left or front end of the valve member as compared to the total force bearing on the valve in the opposite direction. Thus, in the inactive position of the valve, fluid may flow between the seats 51, 52 out through the piston head opening 32 into the main body of the cylinder, finally to escape through the outlet 16.

To operate the motor the operating mechanism is maneuvered to effect movement of the operating lever 92 toward the outlet end of the cylinder 12 or in the direction of the arrow in FIG. 2. This causes the valve head 50 to move toward or into seating position against the seat 52, restricting or preventing the escape of fluid through the opening 32. As a consequence, fluid pressure on the inlet side of the piston head portion 24 will increase causing the piston to move toward the outlet side of the motor. This will, of course, cause movement of all of the mechanism carried with the piston including the clevis 82 and the element 87. The piston 22 will move to the left or towards the outlet side of the cylinder until the pressure building upon the inlet side of the piston reaches a point where the force created by such pressure on the end of the valve member 48 is equal to the force applied to the lever 92. The valve member 48 will then stop and the piston will move only slightly more to create a vent opening through which fluid may pass from the inlet 14 to the outlet 16 and thus be available for operation of other motors connected downstream to the operated motor.

When the operating mechanism is released, the valve member 48 will immediately be biased to fully open position since the force of the fluid pressure on the front or left end of the valve head 50 is greater than that bearing in the opposite direction as will now be explained. As most clearly apparent in FIG. 4, since the valve seat 51 is not fully seated, it will be subjected to the pressure on the inlet side of the piston 22 as will be the collar 58. The valve face 53 will be subjected to the pressure on the outlet side of the piston 22. The total force thus imposed on the valve head 50 and tending to move it toward the right or to open position is opposed by the manual pressure applied through the lever 92 to the stem 49 and the pressure of the fluid behind the valve head 50 and which will be equal to the pressure of the fluid on the outlet side of the piston. This latter pressure is, of course, less than the fluid pressure on the inlet side of the piston. Hence, upon release of the lever 92 the greater force on the left side of the valve will immediately urge it to open position as mentioned. The fluid behind the valve head 50 will bleed through the vent 67 as the valve is forced to its open or inactive position. With the valve 50 open, fluid will flow freely from the inlet to the outlet side of the piston 22. The motor of the invention is preferably connected in a circuit having a restriction in the outlet line 16. This will cause slight back pressure to be created on the outlet side of the piston 22 in any inactive condition of the motor. This will cause the total force applied to the outlet side of the piston 22 to become greater than the total force applied to the other end by reason of the reduced diameter of the piston rod member 30 whereupon the piston will be urged toward the right of the cylinder 12 and to its neutral position in which the gland 38 is engaged by the shoulder 39.

The servo system of the invention is schematically illustrated in FIG. 1 wherein there is shown a system including two motors 10 and 10' constructed as described above. The motor 10 is supplied with fluid under pressure through a conduit 108 from a pump 110. Fluid leaving the outlet 16 of the motor 10 is passed through a conduit 112 to the inlet side 14' of the motor 10'. Fluid from the outlet 16' of the motor 10' is passed through a conduit 114 to a reservoir 116 from which fluid is passed to the pump by means of a conduit 118. Positioned in the conduit 114 is a throttling valve 120 which will provide a restriction in the outlet side of the motor 10' to create a slight back pressure on the outlet side of the motors 10 and 10' and which, as mentioned above, will cause the motors to be urged to their inactive condition whereby fluid can readily flow through the motor 10 to the motor 10'. Accordingly, the motor 10' can be operated as readily as the motor 10 even though it is supplied from the same source of fluid. If desired, additional motors can be connected independently of one another. The motors 10 and 10' can for all practical purposes be operated simultaneously. Operation of the motor 10 will cause cessation of fluid flow therethrough only momentarily, if at all, while the piston thereof is moved from its inactive to active position. Upon reaching a balance point depending upon the amount of force applied to the operating lever 92, the valve member 48 of the motor 10 will open as described above to permit fluid to bleed through the motor 10 whereupon it will be available for operation of the motor 10'. If a fluid source of sufficient capacity is used, the valve 50 apparently never actually seats but moves only to an equilibrium position. Consequently, fluid is continually traversing the motors in such a system without interruption.

One of the desirable features of the motors of the invention is that the operator retains a sense of "feel" of the control. That is to say, the extent of operation of the motor 10 depends upon the amount of force which is applied to the control mechanism, though this force is much less than would be required for direct manual operation of the mechanism operated by the motor. This "feel" is important and advantageous to an operator in maintaining sensitive control over equipment, such as a crawler-type tractor, in which the servo system of the invention may be advantageously employed to control the steering clutches thereof.

A further advantage of the motor of the invention is that in event of failure of the fluid system, the operator can still exert manual control since control operations of the elements can be effected by sufficient mechanical force applied to the operating lever 92.

Having illustrated and described the preferred embodiment of the invention, it should be apparent to those skilled in the art that the invention permits of modification in arrangement and detail. I claim as my invention all such modifications as come within the true spirit and scope of the appended claims.

1. A control device comprising
   a cylinder,
   a piston reciprocable in said cylinder,
   an inlet port at one end of said cylinder and an outlet port at the other end of said cylinder for the admission and escape, respectively, of actuating fluid,
   said piston having a head and means defining a cylindrical valve member on the inlet side of said piston having an opening through said head to the outlet end of said cylinder,
   a valve member having a valve head disposed in said valve chamber for reciprocable movement therein and being operable to close said valve chamber outlet,
   a fluid passageway in said piston for conducting fluid from the inlet side thereof to said valve chamber at the end thereof adjacent said valve chamber outlet,
   said valve member including an annular portion positioned to engage the side walls of said chamber in fluid tight relation on the side of said passageway opposite said valve chamber outlet,
   piston rod means of smaller diameter than said piston head connected to said head and extending outwardly of said one end of said cylinder,
   said valve member having an operating element extending outwardly of said cylinder through said piston rod means, said element being of lesser cross-sectional area than said valve head,
   and means for venting the portion of said valve chamber behind said annular portion to the outlet side of said piston,
   whereby said valve head will tend to be urged toward open position upon operation of the device so that fluid may bleed through said device.

2. A control device comprising
   a cylinder,
   a piston reciprocable in said cylinder,
   an inlet port at one end of said cylinder and an outlet port at the other end of said cylinder for the admission and escape, respectively, of actuating fluid,
   said piston having a head and a coaxial tubular piston rod means defining a cylindrical valve chamber on the inlet side of said piston having an opening through said head to the outlet end of said cylinder,
   a valve member having a valve head disposed in said valve chamber for reciprocable movement therein and being operable to close said valve chamber outlet,
   a fluid passageway in said piston for conducting fluid from the inlet side thereof to said valve chamber at the end thereof adjacent said valve chamber outlet,
   said valve member including an annular portion positioned to engage the side walls of said chamber in fluid tight relation on the side of said passageway opposite said valve chamber outlet,
   said piston rod means being of smaller diameter than said piston head and extending outwardly of said one end of said cylinder,
   said valve member having an operating element extending outwardly of said cylinder through said piston rod means, said element being of lesser cross-sectional area than said valve head,
   said valve member having a vent therethrough for venting the portion of said valve chamber behind said annular portion to the outlet side of said piston,
   whereby said valve head will tend to be urged toward open position upon operation of the device so that fluid may bleed through said device.

3. A control device comprising a cylinder, a piston reciprocable in said cylinder, an inlet port at one end of said cylinder and an outlet port at the other end of said cylinder for the admission and escape of actuating fluid, respectively, said piston having a head and means defining a coaxial cylindrical valve chamber on the inlet side of said piston, said piston having a coaxial opening through said head from said valve chamber to the outlet end of said cylinder, an annular frusto-conical seat formed in said head immediately about said opening, a fluid passageway in said piston for conducting fluid from the inlet side thereof to said valve chamber, a valve member having a valve head mounted in said valve chamber for reciprocable movement therein, said valve head having a frusto-conical seat formed thereon for engagement with said head seat, said valve seat having a lesser angle of taper relative to the axis of said cylinder than the angle of taper of said head seat, said valve member being operable to close said piston opening, piston rod means of smaller diameter than said piston head connected to said head and extending outwardly of one end of said cylinder, said valve member having an operating element extending outwardly of said cylinder through said piston rod means, said element being of lesser cross-sectional area than said valve head.

4. In a servo system, a source of fluid pressure, a pair of fluid motors each including a cylinder having a fluid inlet adjacent one end and a fluid outlet adjacent its opposite end, means connecting said fluid source to the inlet of one of said motors and means connecting the outlet of said one motor to the inlet of the second of said motors, each of said motors comprising a piston reciprocable in the cylinder thereof, each of said pistons having a head portion, means defining a valve chamber in each said piston, each said piston having an opening from said valve chamber through said head portion to the outlet end of the corresponding cylinder, means in each of said pistons defining a passageway for fluid from the inlet end of said cylinder to said valve chamber therein, a valve member in the valve chamber of each of said pistons movable toward and away from said opening to close and open the same so as to permit the passage of fluid therethrough, each of said pistons having piston rod means extending outwardly of the inlet end of said cylinder through an opening of lesser cross-sectional area than the cross-sectional area of the head portion of said piston, and valve operating means extending outwardly of each of said cylinders through the piston rod means of the corresponding piston operable to move said valve members to close said opening.

5. In a servo system, a source of fluid pressure, a pair of fluid motors each including a cylinder having a fluid inlet adjacent one end and a fluid outlet adjacent its opposite end, means connecting said fluid source to the inlet of one of said motors and means connecting the outlet of said one motor to the inlet of the second of said motors, each of said motors comprising a piston reciprocable in the cylinder thereof, each of said pistons having a head portion, means defining a valve chamber in each said piston, said piston having an opening from said valve chamber through said head portion to the outlet end of the corresponding cylinder, means in each of said pistons defining a passageway for fluid from the inlet end of said cylinder to said valve chamber therein, a valve member in the valve chamber of each of said pistons movable toward and away from said opening to close and open the same so as to permit the passage of fluid therethrough, each of said pistons having piston rod means extending outwardly of the inlet end of said cylinder through an opening of lesser cross-sectional area than the cross-sectional area of the head portion of said piston, valve operating means extending outwardly of each of said cylinders through the piston rod means of the corresponding piston operable to move said valve member to close said opening, and means providing a restriction in the outlet of said second motor so as to effect a back pressure in said motors in the inactive condition of the same.

References Cited in the file of this patent
UNITED STATES PATENTS

| | | |
|---|---|---|
| 1,854,367 | Bragg et al. | Apr. 19, 1932 |
| 1,890,010 | Vickers | Dec. 6, 1932 |
| 1,921,590 | Staude | Aug. 8, 1933 |
| 2,165,817 | Safford | July 11, 1939 |
| 2,394,384 | Horstmann | Feb. 5, 1946 |
| 2,897,787 | Kivisto et al. | Aug. 4, 1959 |
| 2,945,352 | Stelzer | July 19, 1960 |
| 2,981,235 | Seddon | Apr. 25, 1961 |